United States Patent [19]

Bilkadi

[11] Patent Number: 4,885,332

[45] Date of Patent: Dec. 5, 1989

[54] PHOTOCURABLE ABRASION RESISTANT COATINGS COMPRISING SILICON DIOXIDE DISPERSIONS

[75] Inventor: Zayn Bilkadi, Mahtomedi, Minn.

[73] Assignee: Minnesota Mining and Manufacturing Company, St. Paul, Minn.

[21] Appl. No.: 180,056

[22] Filed: Apr. 11, 1988

[51] Int. Cl.$^4$ ............................................. C08L 33/08
[52] U.S. Cl. .................................... 524/714; 524/722; 524/854; 252/182.17; 525/223
[58] Field of Search ...................... 524/854, 722, 714; 252/182.17; 525/223

[56] References Cited

U.S. PATENT DOCUMENTS

| | | | |
|---|---|---|---|
| 4,249,011 | 2/1981 | Wendling | 548/312 |
| 4,262,072 | 4/1981 | Wendling et al. | 430/14 |
| 4,323,591 | 4/1982 | Wendling et al. | 427/53.1 |
| 4,499,217 | 2/1985 | Yoshimura et al. | 523/456 |

*Primary Examiner*—Maurice J. Welsh
*Attorney, Agent, or Firm*—Donald M. Sell; Walter N. Kirn; Mark A. Litman

[57] ABSTRACT

A coating composition comprising a substantially water-free dispersion of colloidal silica, a polyacryloyl monomer, and a free radical initiator.

16 Claims, No Drawings

PHOTOCURABLE ABRASION RESISTANT COATINGS COMPRISING SILICON DIOXIDE DISPERSIONS

FIELD OF THE INVENTION

This invention relates to an energy curable coating composition comprising a dispersion of colloidal silica in a non-aqueous solution of a polyethylenically unsaturated monomer. The invention further relates to substrates bearing an abrasion resistant cured coating of the composition.

DESCRIPTION OF THE PRIOR ART

Transparent plastics are rapidly replacing glass glazing in many applications, such as public transportation vehicles, lenses for eyeglasses and precision optical instruments, and in large multi-story buildings. The lighter weight of the plastics as well as their improved shatter resistance in comparison to glass are two important reasons for the increased popularity of plastics. Polycarbonates and polymethyl methacrylates are two important examples of clear plastics that are rapidly replacing glass in many applications.

Plastics, however, are softer than glass and thus more vulnerable to marring, or scratching caused, for example, by everyday exposure to abrasives, such as dust, cleaning equipment, or weathering. Such scratching is deleterious to the optical clarity of the plastic.

Soft plastics are often protected from marring or scratching by application of a hardenable top coat especially formulated to be abrasion resistant. Examples of the most successful top coats for this purpose are certain room-temperature curing silicone resins derived from functionalized silane monomers, such as disclosed in U.S. Pat. No. 4,049,861.

U.S. Pat. Nos. 3,976,497; 3,986,997; 3,708,285; 4,368,236; 4,368,235; 4,478,876; and 4,491,508 disclose that the scratch resistance of polymers can be enhanced by coatings derived from hydrolyzable silanes and polymers derived from a combination of acryloxy functional silanes and polyfunctional acrylate monomers. The scratch resistance of these polymers can be further enhanced by addition of colloidal silica. Most likely this improvement is due to a combination of two effects brought on by the addition of colloidal silicon dioxide particles: (1) the mere substitution of part of the soft silicone resin by the much harder inorganic oxide particles that are trapped in the polymer matrix and (2) changes in the mechanical properties of the coating as a result of the "crosslinking" effect of the inorganic oxide. Whatever the mechanism may be, the addition of colloidal silica to hydrolyzable silanes and functionalized silanes is a straightforward process because the polycondensation of the siloxane is carried out in the aqueous environment of the colloidal silica. There are, however, several drawbacks associated with the utilization of hydrolyzed silanes or functionalized silanes in the formulation of abrasion resistance coatings. The first is that the shelf-life of the partially hydrolyzed silanes is often limited due to the progressive gelling of the condensation polymer, as is documented in U.S. Pat. No. 3,986,997 for example. Another drawback is that full cure of the silesquioxane to yield the highly crosslinked silicone matrix is often an extremely slow process that is only partially remedied by a catalyst or by heating. As a result of the slow cure kinetics, silane based abrasion resistance coatings are often susceptible to shrinkage and ultimately to stress-cracking. Lastly, silane based hard coats suffer from poor adhesion to plastic substrates, such as polymethyl methacrylate, and require therefore some form of physical or chemical priming of the adherent surface.

Attractive alternatives to silane-based hard coats for protecting plastic substrates are compositions containing in polymerized form, one or more acrylate or methacrylate functionalities on a monomer, oligomer or resin. The popularity of acrylic or methacrylic based hard coats is due to at least three reasons: (1) they yield transparent films, and are therefore ideal for protecting substrates that need remain transparent, or possess a color that need to be visible, (2) for decorative or other functional reasons, they are easily cured at room temperature by exposure to U.V. or electron beam irradiation, which qualifies them as top coats for heat sensitive substrates, and (3) they are capable of yielding films with high crosslink density (and therefore high hardness) by virtue of the fact that more than one crosslinkable functionality may be attached to a given monomer or a given oligomer chain.

Abrasion resistant coating compositions based on multifunctional acrylate or methacrylate monomers have been disclosed in the prior art. In U.S. Pat. No. 3,968,305 there is described a plastic shaped article having a scratch-resistant polymer surface layer consisting of, in polymerized form, (a) 20 to 100 weight percent of a compound having a total of at least 3 acryloxy and/or methacryloxy groups linked with a straight chain aliphatic hydrocarbon residue and (b) 0 to 100 weight percent of at least one copolymerizable mono- or diethylenically unsaturated compound and (c) a crosslinking catalyst for thermal or U.V. radiation cure. In U.S. Pat. No. 3,968,309 there is disclosed a mar-resistant coating composition comprising at least 30 percent by weight of at least one polyfunctional methacryloyloxy or acryloyloxy compound to which is added 0.01 to 5% by weight of a fluorine-containing surfactant.

In U.S. Pat. Nos. 4,198,465 and 4,262,072 there are disclosed abrasion resistant coating formulations containing polyfunctional acrylate and/or methacrylate monomers having heterocylic hydantoin groups in the backbone and capable of hardening by exposure to U.V. light.

Despite their advantages in so far as ease of crosslinking, transparency, and hardness after cure, the abrasion resistance of top coats derived from polyfunctional acrylates or methacrylates still leaves much room for improvement, and is far inferior to the abrasion resistance of glass or most ceramic materials.

It is therefore highly desirable to provide film-forming materials with an abrasion resistance exceeding that typical of top coats derived from polyfunctional acrylate or methacrylate monomers, and where the transparency, flexibility and ease of cure associated with the acrylate or methacrylate based coatings are maintained.

The present invention discloses novel photocurable compositions whereby the acrylate or methacrylate monomers or oligomers have been modified by the incorporation of an inorganic oxide sol, namely silicon dioxide sol.

In U.S. Pat. No. 4,499,217 there are disclosed thermoset resin liquid compositions containing colloidal silica that had been freed from water and redispersing in alcohol prior to mixing with the resins. An example of an acrylic resin is used. Although the dry cured film of this composition was reported to exhibit enhanced abrasion resistance, the curing conditions required for thermo-setting resins in general, including those reported in U.S. Pat. No. 4,499,217 preclude them from being used as scratch-resistant coatings for the great majority of common plastic substrates. Depending on the nature of the thermosetting resin curing times ranging from half an hour to several hours at temperatures often well exceeding 100° C. are required. Such conditions are conducive to softening, distortion and/or degradation of commercially important plastics such as polymethyl methacrylate, polyesters, polyolefins, and polycarbonates. The compositions disclosed in this patent use polymerizable resins in order to achieve high molecular weights of the coating. No monomers are used.

Photocurable abrasion resistant coating compositions comprising a non-aqueous dispersion of colloidal silica in polyethylenically-unsaturatedmonomer or its use to provide substrates with an improved abrasion resistant coating have not been disclosed.

SUMMARY OF THE INVENTION

Accordingly, it is one aspect of the present invention to provide a new curable especially photocurable protective, abrasion resistant coating for solid substrates.

Another aspect of this invention is to provide a photocurable coating composition especially well suited as an abrasion resistant coating for transparent substrates.

Another aspect of this invention is to provide an air photocurable protective coating composition which is readily applied to solid substrates and which, when applied and cured provide a coating with improved adhesion, resistance to moisture and humidity, and improved adhesion to plastic substrates.

Another aspect of this invention is to provide a photocurable protective coating resin which, when applied to a plastic substrate, prevents discoloring of the substrate.

These and other benefits may be accomplished herein by providing an energy curable coating composition comprising a substantially anhydrous dispersion of colloidal silica having a particle size of less than 100 nanometer (nm), preferably less than 75 nm, more preferably less than 50 nm in a solution of polyethylenically-unsaturated monomer, said composition preferably comprising by weight per part of polyethylenically-unsaturated monomer 0.1 to 2.5 parts (preferably 0.25 and 1.0 parts) colloidal silica, and 2 to 10 parts (preferably 4 to 5 parts) volatile nonaqueous solvent.

DETAILED DESCRIPTION OF THE INVENTION

Preferred polyethylenically-unsaturated monomers useful in this invention are the polyfunctional acrylate monomers of the general formula:

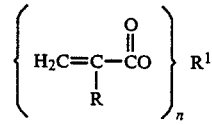

wherein
R is hydrogen, halogen, lower alkyl group of 1 to 3 carbon atoms, or phenyl;
$R^1$ is a polyvalent organic group having a valence of n that is the residue of an organic polyol having n hydroxyl groups said residue formed by removal of n hydroxyl groups from the organic polyol, the organic polyol being selected from saturated linear, branched, and cyclic aliphatic polyols having 2 to 10 carbon atoms and optionally one to three catenary (i.e., backbone) oxygen atoms or

groups and from aromatic polyols having 6 to 12 carbon atoms; and
n is an integer having a value of 2 to 6.

Examples of the preferred polyethylenically-unsaturated monomers of use in the composition of the invention are the polyacrylic acid or polymethacrylic acid esters of polyhydric alcohols including, for example, the diacrylic acid and dimethacrylic acid ester of aliphatic diols such as ethyleneglycol, triethyleneglycol 2,2-dimethyl-1,3-propanediol, 1,3- cyclo pentanediol, 1-ethoxy-2-3-propanediol, 2-methyl-2,4 pentanediol, 1,4-cyclohexanediol, 1,6-hexamethylenediol 1,2- cyclohexane diol, 1,6-cyclohexanedimethanol; the triacrylic acid and trimethacrylic acid esters of allphatic triols such as glycerin, 1, 2, 3-propanetrimethanol, 1,2,4-butane triol, 1,2,5- pentanetriol, 1,3,6-hexanetriol, and 1,5,10-decanetriol; tbe tetraacrylic and tetramethacrylic acid esters of aliphatic triols such as 1,2,3,4-butanetetrol, 1,1,2,2,-tetramethylolethane, 1,1,3,3,-tetramethylolpropane, and pentaerythritol tetraacrylate; the pentaacrylic acid and pentamethacrylic acid esters of aliphatic pentols such as adonitol: the hexaacrylic acid and hexamethacrylic acid esters of hexanols such as sorbitol and dipentaerythritol; the diacrylic acid and dimethacrylic acid esters of aromatic diols such as resorcinol, pyrocatechol, bisphenol A, and bis(2-hydroxyethyl) phthalate; and the trimethacrylic acid ester of aromatic triols such as pyrogallol, phloroglucinol, and 2-phenyl-2,2-methylolethanol; and mixtures thereof. Other polyethylenically-unsaturated monomers that can be used in the composition of the invention are diallyl phthalate, divinyl ether, 1,2-divinyloxyethane 1,4-(dicrotonyloxy)butane and the like.

It is preferable that the photocurable compositions contain appropriate energy activated initiators of polymerization to effect crosslinking either in air or in inert atmosphere, such as nitrogen.

Polymerization initiators suitable for use in the crosslinkable compositions of the invention are those compounds which liberate or generate a free-radical on addition of energy. Such catalysts include peroxy, azo, and redox systems all of which are well known and are described frequently in polymerization art. Included among free-radical catalysts are the conventional heat-activated catalysts such as organic peroxides and organic hydroperoxides, e.g., benzoyl peroxide, tertiarybutyl perbenzoate, cumen hydroperoxide, azobis-(isobutyronitrile) and the like. The preferred catalysts are photopolymerization initiators which facilitate polymerization when the composition is irradiated. Included among such initiators are acyloin and derivatives thereof, such as benzoin, benzoin methyl ether, benzoin ethyl ether, benzoin isopropyl ether, benzoin isobutyl ethers and methylbenzoin, diketones such as benzil and diacetyl etc.: phenones such as acetophenone, 2,2,2-tribromo-1- phenylethanone, 2,2-diethoxyacetophenone, 2,2-dimethoxy-2- phenylacetophenone, 2,2,2-tribromo-1(2-nitrophenyl)ethanone, benzophenone, and 4,4-bis(dimethylamino)benzophenone. Normally, the initiator is used in amounts ranging from 0.1 to 10%, preferably 2 to 4% by weight.

The composition of the invention can be diluted with up to 6 parts, preferably 1 to 2 parts, by weight per part of poly ethylenically-unsaturated monomer of any monoethylenically- unsaturated monomer copolymerizable with the polyethylenically unsaturated monomer. Generic classes of useful comonomers include acrylic acid and methacrylic acids, esters and anhydrides; ethylenically unsaturated anhydrides, olefins, acrylamides; ethylenically unsaturated ureas and urethanes; vinyl esters, vinyl ethers, vinyl halides, vinyl epoxy resins, vinyl silanes and siloxanes, vinyl heteocycles, and prepolymers and polymers of these materials. Particularly suitable monoethylenically-unsaturated monomers include methyl methacrylate, ethyl acrylate, styrene, butadiene, 2-chlorostyrene, 2,4-dichlorostyrene, acrylic acid, acrylamide, acrylonitrile, t-butyl acrylate, methyl acrylate, butyl acrylate, N-vinyl pyrrolidone, 2-(N-butylcarbamyl)ethyl methacrylate 2-(N-ethylcarbamyl)ethyl methacrylate, and 1,3,5-tri(2-methacryloxyethyl)-s-triazine.

Colloidal silicas of use in the composition of the invention are well known and prepared by methods well known in the art. Colloidal silicas in water or water-alcohol solutions are available commercially under such trade names as Ludox TM (manufactured by E. I. duPont de Nemours and Co., Inc., Wilmington, DE, USA) or Nalco TM (manufactured by Nalco Chemical Co., Oak Brook, IL, USA). Although both alkaline and acidic forms of silica hydrosols are available commercially, only colloidal dispersions having a pH lower than 7 and preferably lower than 4 may be used, otherwise rapid flocculation would ensue. One excellent starting material is Nalco TM 1129 which is provided as colloidal silica dispersion in 60%/40% by weight isopropanol/water solution wherein the mean particle size is 20 millimicrons, the pH is 3.5 and the solid content is 30% by weight. Another excellent commercial starting material is Nalco 1034A available as a silica hydrosol with mean particle size of 20 millimicrons, pH 3.2, and solid content 34% by weight. It should be obvious to those skilled in the art, however, that any silica hydrosol, including alkaline silica hydrosols, may be used as sources of silica particles for the embodiment of this invention as long as their pH is reduced to the 2.5-7.0 range.

The separation of the aqueous colloidal silica from the water and its transfer to a volatile non-aqueous solvent that is compatible with the class of polyacrylates described above may be effected by first adding a water-miscible organic solvent A and removing the water. If the water miscible solvent A has a boiling point higher than that of water, the water can be removed by simple distillation. If the water miscible solvent A has a boiling point lower than that of water, the water can be removed by azeotropic distillation. It is preferable that the water be removed as rapidly as possible and at as low a temperature as possible. Consequently, it is preferable to conduct the distillation under vacuum. This procedure is also disclosed in U.S. Pat. No. 4,499,217.

Preferably the water-miscible solvents of use in the dehydration of the colloidal silica are protic group containing solvents such as the lower alcohols having 1 to 4 carbon atoms, lower glycols having 2 to 6 carbon atoms and ether oxygen, and most preferably lower glycol ethers having 3 to 6 atoms and 1 to 2 ether linkages. Specific examples are methanol, ethanol, 2-propanol, n-butanol, t-butyl alcohol, ethylene glycol, methoxyethanol ethoxyethanol, and propoxyethanol , butoxyethanol, methyl "Carbitol", and ethyl "Carbitol" and mixtures of any combination thereof. The use of these protic solvents allow the dehydradation to be carried out to the point where water is substantially all removed. For example use of propoxy ethanol in the vacuum distillation of water from acidic colloidal silica allows the dehydration to proceed to less than 1% residual water in the remaining alcoholic dispersion. In this manner up to 65% by weight colloidal silica dispersions in propoxyethyl alcohol may be easily prepared.

Non-protic water-miscible solvents that can also be used in the dehydration of colloidal silica are aliphatic esters and ketones such as ethyl acetate, propyl acetate, butyl acetate, methoxyethyl acetate, ethoxyethyl acetate, propoxyethyl acetate, butoxyethyl acetate, triethyl phosphate, methyl ethyl ketone and methyl propyl ketone. However, in the majority of cases whereas water-miscible ester or ketone has to be used, it is preferred to have an alcohol present even as a minor component during the dehydration step. Thus 90/10 mixtures of alcohol in the acetates or ketones mentioned above is often suitable. The photocurable compositions also contain appropriate photosensitizers specially formulated to effect crosslinking either in air or in inert atmosphere, such as nitrogen. In general the amount of photosensitizer may vary from about 0.01 to 10% by weight of the total polymerization composition. When the quantity is less than 0.01% by weight, the polymerization rate becomes extremely low. If the initiator is used in excess of 5% by weight, no correspondingly improved effect can be expected. Thus addition of such greater quantity is economically unjustified. Preferably, about 0.25 to 4.0% of initiator is used in the polymerizable composition.

The compositions of the present invention may generally be described as containing (a) 5-75% by weight of colloidal silica (the liquid phase having less than 3% by weight water present, this being the definition of "water-free")

(b) at least 5% by weight of a polymerizable polyacrylate, (c) at least 15% by weight of polymerizable acryloyl (including the polyacrylate), (d) 0.1 to 10% by weight of a free radical initiator (including both thermal and photo initiated systems), and (e) zero to 25% by weight of a compatible filler or binder resin soluble in the solution of the polyethylenically unsaturated monomers.

Preferably the composition comprises 10-70% water-free silica sol, most preferably 30-70% water-free silica sol; 5-90% polyacryloyl compound, most preferably 30 to 70% polyacryloyl compound; 5-90% acryloyl monomer (including mono- and polyacryloyl), 0-20% compatible filler resin, and 0.5 to 7% photoinitiator system in a solvent carrying medium. The viscosity and percent solids of the composition may be adjusted by addition of one or more of the aforementioned volatile, nonaqueous protic or non-protic solvents.

These compositions are particularly useful when applied to substrates that would show adverse effects if subjected to 100° C. for more than 15 minutes, and preferred for substrates that would show adverse effects when exposed to 80° C. for 15 minutes. Such adverse effects would include discoloration, shrinkage, warping, imaging, or permanent change in physical or chemical properties.

For photocuring thin film coatings of said compositions in air, preferable photosensitizers consisting of mixtures of ketone type and hindered amine type compounds are used. Among the preferred ketones are benzophenone, acetophenone, benzil, benzaldehyde and o-chlorobenzaldehyde, xanthane, thioxanthone, 9,10-anthraquinone, and many aromatic ketones. Among the preferred hindered amines are methyl diethanolamine, ethyldiethanolamine, dimethylethanolamine, diethylenethanolamine, triethanolamine, phenylmethylethanol amine, dimethylaminioethyl benzoate, and others. Preferred ratios by weight of ketone to amine are between 80/20 and 20/80, but in general ratios of 50/50 to 60/40 are satisfactory.

For effecting photocure in inert environment, such as nitrogen or argon, many commercially available photosensitizer compounds are known, among which those known under the trade name Irgacure TM (available from Ciba-Geigy Co.), for example Irgacure TM 184 (2-hydroxy-2- cyclohexyl-1-phenyl-1-ethanone).

For effecting the cure with particle radiation, e.g., gamma rays, X-rays, alpha and beta particles from radioisotopes, electron beams and the like, no additional source of free radicals for initiating polymerization and crosslinking is required.

In the practice of the present invention, the curable coating compositions are compounded by adding together the silica organosol, preferably being 30–40% by weight silica in a solvent, the polyfunctional acrylate monomer or mixture thereof, preferably being 20–30% by weight solution in suitable organic solvent, the optional monofunctional or polymeric diluents, an initiator in the proportion of about 2–4% by weight of polymerizable monomers, and any other optional additives such as flexibilizers, thickeners, stabilizers, inhibitors, lubricants and dyes. Where curing is to be brought about by ultraviolet irradiation it is preferable that these addenda be transparent to the radiation used for curing. After thorough mixing of the components, a generally homogeneous coating composition is obtained which may be applied to substrates in any number of ways: by dipping, spraying, spincoating, rollcoating, knifecoating, electrospraying, and the like Afterwards the solvent, if any, is allowed to evaporate and the coating cured in air by UV irradiation at dosages of from 1 megarad to 100 megarad or more. The UV radiation used may have a wavelength ranging from 18.5 to 400 nm. Suitable sources of radiation include mercury, xenon, carbon arc and tungsten filament lamps, sunlight, etc.

SUBSTRATES

Although the substrates of soft plastic sheet material show the greatest improvement upon application of the coating, the composition can be applied to other substrates, such as wood, ceramics, leather, metals, printed surfaces, marble, and textiles. The substrates may be in substantially any form, such as sheets, films, fibers, fabrics, and shaped solid objects. Amongst the substrates particularly finding advantages with coatings of the present invention are polymeric resins, including both thermoplastic and thermoset resins (e.g. polyesters, polyethers, polyamide, polyurethanes, polyacrylates, polyolefins, polyVinyls, cellulose esters, epoxy resins, phenolic resins, polysiloxanes, polystyrene, copolymers of acrylonitrile-styrene, butyrates, and the like. Suitable substrates are also ceramics, including glass, fused ceramic sheeting, marble, wood, leather, textiles, and printed or imaged surfaces. The coatings are useful particularly on refractive surfaces, such as prisms and lenses, etc., and reflective surfaces, such as street signs, mirrors, etc. They are also useful on metallized polymeric film which is transparent and used as a light screen on windows. Particularly useful substrates for application of the present invention would be those requiring transparent protective coatings. Finished photographic prints, and films, paintings, transparency, car windshields, instant film, photothermographic and thermoqraphic paper and film, photoconductive substrates, opthalmic lenses, polarizing elements, liquid crystal displays, motion picture film, street and traffic signs, reflective surfaces, retroreflective surfaces, traffic lights, and many other surfaces are usefully coated according to the practice of the present invention.

Although the coating compositions of this invention are such that they yield highly adhering protective films on most substrate surfaces, separate primer compositions, comprising a single ingredient or mixture of ingredients, may be used to improve the bond of the coating to the substrate. Texturizing, chemical or physical treatment of the surface may also be used to improve bonding. The coatings of this invention are generally between 0.5 and 500 microns thick, preferably between 1 and 50 microns, and most preferably between 3 and 25 microns. It is, however, contemplated that the composition of the invention can also be used to make: adhesive caulking, and sealing compositions; casting and molding compositions, potting and encapsulating compositions; and impregnating and saturating compositions.

The following specific, but non-limiting, examples will serve to illustrate the present invention.

EXAMPLES 1–3

Five hundred grams of Nalco TM 1034A (an aqueous colloidal silica having a pH of 3.5 and a solids content of 30%) was concentrated at 55° C. in a roto-evaporator to 300g. The concentrate was diluted with 1200g n-propanol and the solution obtained added over a period of thirty minutes to the still pot of a distillation apparatus containing 900g of refluxing n-propanol. There distilled an azeotrope of water and n-propanol at 88° C. Distillation was continued until the still head temperature increased to 97° C. There remained in the still pot 650g of clear silica alcosol that had a silica content of 23% and analyzed less than 1% water.

A solution in n-propanol was made to contain 23% by weight of SRTM351 (trimethylolpropane triacrylate available from Sartomer Corp.) and 4% by weight based on weight of SR 351 of Irgacure TM 184, a photoinitiator available from Ciba-Geigy Co. Coatings containing 66.6, 50.0, 33.3 and 0% colloidal silica were prepared for Examples 1, 2, 3 and C1 (a comparative example, illustrating the prior art) by mixing one part of the triacrylate solution with 2, 1, ½, and 0 parts of the alcosol and coating the solution onto 100 micrometer thick film of unprimed polyethylene terephthalate (PET) using a #10 Meyer rod. On evaporation of the solvent, the coatings were radiation cured in air in a UV Processor, Model No. Q.C. 120N (manufactured by Radiation Polymer Co ) at a rate of 30 meters per minute under a 16watts per centimeter high pressure mercury lamp. The cross-hatch adhesion (ASTM D3359-

83) Taber Haze, and resistance to steel wool of each coating is given in Table I.

The abrasion tests were performed on a 3" diameter disks using the Taber Abraser Model 503 equipped with CS IOF wheels which are resurfaced every 10 cycles by abrading for 10 cycles on S-11 refacing disks. Each abrasing wheel supported a 500g weight during operation. The percent haze measurements were performed on a Gardner Hazemeter equipped with a rotating disk support. The percent haze on the wear track is the average reading over a full rotation of the disk.

TABLE I

| Ex. No. | Composition (%) SR 351 | Composition (%) $SiO_2$ | Abrasion Resistance Taber Haze % (Cycles) (100) | (500) | (1000) | Steel Wool | ASTM D3359-83 Adhesion X-hatch % |
|---|---|---|---|---|---|---|---|
| 1 | 33.3 | 66.6 | 2.7 | 8.9 | 18 | Excellent | 95–100 |
| 2 | 50 | 50 | 2.1 | 5.7 | 8.1 | Excellent | 95–100 |
| 3 | 66.6 | 33.3 | 2.1 | 7.3 | 10.1 | Excellent | 95–100 |
| C1 | 100 | 0 | 2.4 | 11.3 | 23.1 | Fair | 45–50 |
| Uncoated | | | 26.1 | — | — | Poor | — |

EXAMPLE 4

To 32.6g of trimethylolpropane triacrylate were added 66g of methyl ethyl ketone and 1.39 of Irgacure TM 184 photoinitiator (called Solution A). One part by weight of this solution was mixed with one part of a 30% by weight dispersion of colloidal silica having a particle size of 25 nm in 2-propoxyethanol. The resulting clear mixture was used to coat a 100 micrometer thick sheet of unprimed polyethylene terephthalate using a #g Meyer bar. After drying and curing as described in Examples 1–3, the cured film exhibited 95–100% crosshatch adhesion and an average percent haze of 100% after 1000 abrasion cycles.

EXAMPLE 5

To one part of Solution A (described in Example 4) was mixed 0.5 parts by weight of the colloidal silica used in Example 4 and the resulting clear dispersion coated onto 1.5 mm thick Laxan polycarbonate sheets using a #9 Meyer bar. After drying and curing the coating as described in Examples 1–3. The coated sheets were divided into two groups. The first group was soaked in distilled water at room temperature for 12 hours, and then dried in an oven at 55° C. for one hour. The dried coating exhibited a 95–100% cross-hatch adhesion and an average percent Taber haze of 15.2 after 1000 cycles. The second group of coated sheets were not soaked. The coating exhibited 95–100cross-hatch adhesion to the polycarbonate and an average Taber haze of 15.0 after 1000 abrasion cycles.

EXAMPLE 6

One part by weight hexanediol diacrylate, one part ethoxylated trimethylolpropane triacrylate (SR 454, Saroomer Corporation), 0.1 part Tinuvin TM 770, a hindered amine type ultraviolet light stabilizer derived from a substituted piperidine, (available from Ciba-Geigy Corp.); and 0.02 parts Irgacure 184 were dissolved in 4.5 parts n-propanol and part of the solution used to coat four sheets of 100 micrometer thick polyethylene terephthalate film with a No. 12 Meyer rod. After drying and curing in I5 the UV Processor as in Example 1, the hardened coating exhibited 45–55% cross-hatch adhesion and an average % Taber haze of 12 after 300 abrasion cycles.

One part by weight of the above mixed solution was added to one part of the silica colloid prepared in Examples 1–3. The resulting clear dispersion was coated on four polyethylene terephthalate sheets with a No. 12 Meyer Rod. After drying and curing in the UV Processor as in Examples 1–3, the hardened coating exhibited 95–100% crosshatch adhesion and an average percent Taber haze of 7.2 after 300 abrasion cycles.

EXAMPLES 7

One part by weight ethoxylated trimethylolpropane triacrylate, one part methyl methacrylate, 0.25 part Carboset TM 53I (polyacrylic acid resin) available from B. F. Goodrich, and 0.09 part of a photoinitiator composed of equal amounts of benzophenone and methyldiethanolamine were dissolved in 10 parts ethanol. One part by weight of this solution was mixed with one part of the colloidal silica used in Example 4 to form a clear but relatively viscous mixture. The clear syrupy dispersion was coated on 100 micrometer thick unprimed polyester film and dried to provide a 5 micrometer thick film. The coating was then dried and cured in air in the UV Processor by one pass at 12mmin. The cured film was flexible and did not crack upon folding the polyester substrate upon itself. It exhibited 95–100% crosshatch adhesion and 2–5% Taber haze after one hundred abrasion cycles.

The term polyacryloyl monomer is defined to include both conventional polyacryloyl monomers (e.g., with molecular weights of less than 500) and polyacryloyl oligomers (with molecular weights of less than about 10,000). Oligomers tend to be more viscous, but are still easily coatable, particularly in combination with the lower molecular weight (less than 500 mw) monomers. The oligomers, as is well understood in the art usually comprise a polymer backbone having a number of acryloyl (methacryloyl) substituents pendant therefrom. The oligomer may constitute from 0 to 100% of the monomer and be present as from 0 to 95% of the total composition.

Either aliphatic, aromatic or heterocyclic bridging groups (or combinations thereof) may be present in the monomer, but aliphatic groups are clearly preferred for their improved weathering properties.

I claim:

1. A coating composition comprising a substantially water-free dispersion of colloidal silica, a polyacryloyl monomer, and a free radical initiator.

2. A coating composition comprising by weight:
   (a) 5–75% substantially water-free colloidal silica,
   (b) 5–95% acryloyl monomer, of which at least 5% of the total composition comprises a polyacryloyl monomer,
   (c) 0.1 to 10% of an initiator comprising a free radical photoinitiator system, and
   (d) 0–25% of a compatible filler resin.

3. The composition of claim 1 wherein there is 0.1 to 2.5 parts by weight of colloidal silica to one part by weight of polyethylenically-unsaturated monomer.

4. The composition of claim 2 wherein the colloidal silica has a diameter of 5 to 30 millimicrons.

5. The composition of claim 2 further comprising a polyethylenically unsaturated crosslinking agent in an amount sufficient to effect crosslinking of the composition.

6. The composition of claim 2 further comprising 2 to 10 parts of a volatile nonaqueous solvent.

7. The composition of claim 1 wherein the polyacryloyl monomer is a polyfunctional acrylate monomer having the general formula:

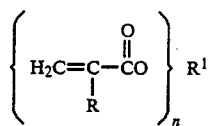

wherein
R is hydrogen, halogen, lower alkyl group of 1 to 3 carbon atoms, or phenyl;
$R^1$ is a polyvalent organic group having a valance of n that is the residue of an organic polyol having n hydroxyl groups that remain after the removal of n hydroxyl groups, the organic polyol being selected from saturated linear, branched, and cyclic aliphatic polyols having 2 to 10 carbon atoms and optionally one to three catenary (i.e., backbone) oxygen atoms or

groups and from aromatic polyols having 6 to 12 carbon atoms; and n is an integer having a value of 2 to 6.

8. The composition of claim 2 wherein said filler resin is not crosslinkable with any components of the composition.

9. The composition of claim 3 wherein said filler resin is not crosslinkable with any components of the composition.

10. The composition of claim 4 wherein said filler resin is not crosslinkable with any components of the composition.

11. The composition of claim 2 wherein the filler is polymethyl methacrylate.

12. The composition of claim 2 comprising by weight:
(a) 30 to 70% water-free silica sol,
(b) 30 to 70% polyacryloyl compound.

13. The composition of claim 2 wherein the polyacryloyl monomer is trimethylol propane triacrylate.

14. The composition of claim 2 further containing from 1 to 10% by weight of a hindered amine type ultraviolet radiation stabilizer.

15. The composition of claim 4 further containing from 1 to 10% by weight of a hindered amine type ultraviolet radiation stabilizers.

16. The composition of claim 7 further containing from 1 to 10% by weight of a hindered amine type ultraviolet radiation stabilizers.

* * * * *

UNITED STATES PATENT AND TRADEMARK OFFICE
CERTIFICATE OF CORRECTION

PATENT NO. : 4,885,332
DATED : December 5, 1989
INVENTOR(S) : Bilkadi

It is certified that error appears in the above-identified patent and that said Letters Patent is hereby corrected as shown below:

Column 2, line 66, "redispersing" should be --redispersed--.

Column 4, line 24, "allphatic" should be --aliphatic--.

Column 5, line 15, "heteocycles" should be --heterocycles--.

Column 8, line 67, "16watts" should be --165 watts--.

Signed and Sealed this

Seventh Day of May, 1991

Attest:

*Attesting Officer*

HARRY F. MANBECK, JR.

*Commissioner of Patents and Trademarks*

Disclaimer 4,885,332—*Zayn Bilkadi*, Mahtomedi, Minn. PHOTOCURABLE ABRASION RESISTANT COATINGS COMPRISING SILICON DIOXIDE DISPERSIONS. Patent dated Dec. 5, 1989. Disclaimer filed Aug. 15, 1991, by the assignee, Minnesota Mining and Manufacturing Co.

Hereby enters this disclaimer to claims 1-16 of said patent.
[*Official Gazette October 29, 1991*]